Oct. 23, 1951  L. M. CHAPMAN ET AL  2,572,700
POWER-OPERATED ADJUSTING MEANS FOR HARVESTER REELS
Filed March 5, 1949  2 SHEETS—SHEET 1

INVENTORS
LELAND M. CHAPMAN
ROBERT E. WHITNEY
BY
ATTORNEYS

Oct. 23, 1951  L. M. CHAPMAN ET AL  2,572,700
POWER-OPERATED ADJUSTING MEANS FOR HARVESTER REELS
Filed March 5, 1949

INVENTORS
LELAND M. CHAPMAN
ROBERT E. WHITNEY
BY
ATTORNEYS

Patented Oct. 23, 1951

2,572,700

UNITED STATES PATENT OFFICE 2,572,700

POWER-OPERATED ADJUSTING MEANS FOR HARVESTER REELS

Leland M. Chapman, Bowling Green, and Robert E. Whitney, Weston, Ohio, assignors to Deere & Company, Moline, Ill., a corporation of Illinois Application March 5, 1949, Serial No. 79,884

7 Claims. (Cl. 56—222)

1

This invention relates to the adjustment by power of an operating element of a harvesting machine or the like, and more particularly to the adjustment of the harvester reel by power derived from the reel itself.

In the ordinary harvester, typical of which is a combine including a cutter bar and platform above which a reel is carried for rotation, it is desirable to adjust the reel vertically with respect to the cutter bar to vary the distance above the cutter bar of the circular path through which the reel bats travel. In a prior well known construction, such as based on the disclosure in the U. S. patent to Lohse 2,414,958, the harvester reel is supported by a reel support which is adjustable vertically with respect to the harvester platform. Adjustment is accomplished by means of a vertical toothed rack connected to the platform and extending upwardly in proximity to the reel support, at which point the rack is engageable by a pinion rotatable in bearing means on the support. Mechanism for rotating the pinion in at least one direction includes a lever and step-by-step means controlled by successive pulls on a rope connected to the lever and extending to the tractor or other vehicle to which the harvester is connected. Although this mechanism operates satisfactorily, it is not the most efficient, because it involves labor on the part of the operator and particularly because it requires the transmission of manual effort to a point considerably remote from the operator, since the harvester platform is quite a distance to the rear of the operator's position on the tractor.

Accordingly, it is the principal object of the present invention to improve an adjusting device of the type referred to by means of incorporating therein power-transmitting mechanism which derives power from the rotating reel and transmits such power to an adjusting device, such as the rack and pinion referred to. It is an important object of the invention to provide the power-transmitting means in the form of a simple type of clutch which may be actuated by a single pull on a rope or similar control element extending to a position convenient to the operator. A further important object resides in means for immobilizing the adjusting device so that the adjusted position of the reel may be secured; and, in this respect, it is a further object to coordinate the immobilizing means with the control means for the power-transmitting means in such manner that the immobilizing means is rendered ineffective when the power-transmitting means is conditioned to transfer power from the reel to the adjustable device.

A further object of the invention relates to the provision of a conversion or attachment unit whereby the power-transmitting means may be readily attached to a harvester in place of the manually operated device heretofore provided. In this respect, it is an important object to provide the conversion or attachment unit in such manner that the unit can be installed without materially altering the prior structure.

The foregoing and other important objects and desirable features inherent in and encompassed by the present invention will become apparent to those skilled in the art as a preferred embodiment of the invention is fully disclosed in the following detailed description and accompanying sheets of drawings in which.

Figure 1:
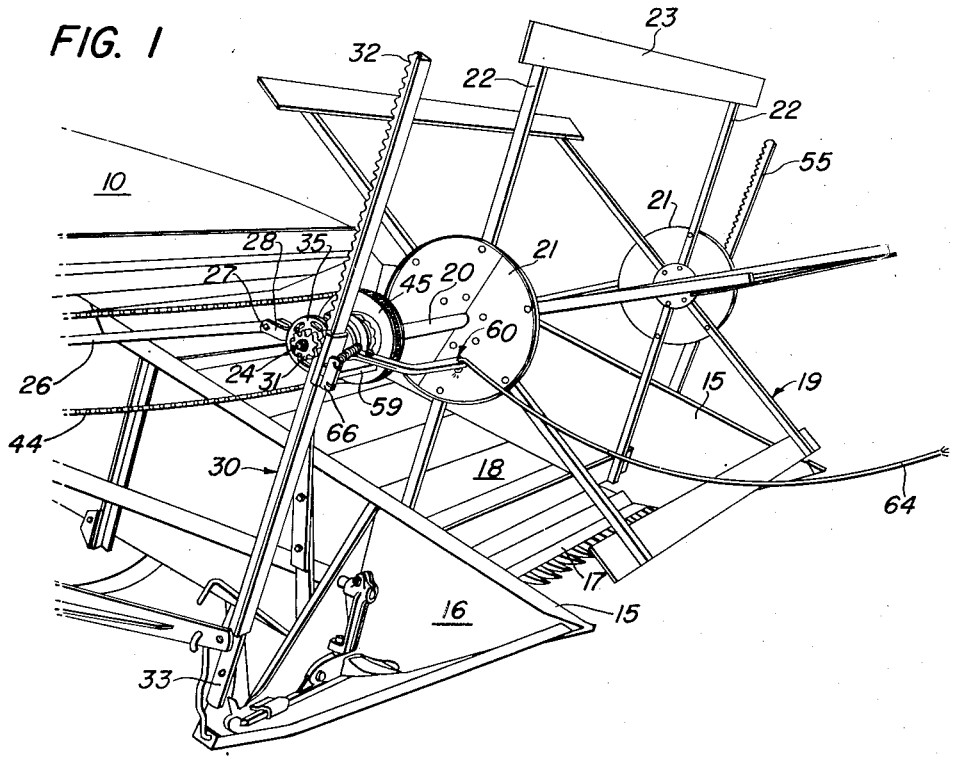
Figure 1 is a perspective view of the forward portion of a harvester showing the harvester frame, platform, rotating reel, and the improved adjusting device.

The combine structure illustrated in the drawings is intended merely to represent one type of harvester in which the invention may be used and is not intended to exclude other harvesting or like machines to which the principles of the invention may be applicable. The harvester illustrated comprises a main longitudinal body 10 carried on wheels, one of which is visible in Figure 3 and identified by the numeral 11. The combine includes a forwardly extending draft member 12 by means of which the combine may be connected to a tractor or other draft vehicle. Various components of the combine have their source of power in a gear box 13 which in turn obtains power from a propeller shaft 14 connectible at its forward end to the power take-off shaft of the vehicle that propels the machine.

The forward portion of the combine includes suitable framework in the form of side sheets 15 and allied members which make up a harvester platform 16, across the front of which extends a cutter bar 17, much in the conventional manner. Grain cut by the cutter bar 17 is conveyed rearwardly by a conveyor 18 to suitable crop-treating mechanism (not shown) contained within a portion of the body 10, all of which may likewise be conventional or of any desired design.

Cutting of the grain by the cutter bar 17 is assisted by means of a rotating reel, designated generally by the numeral 19, which comprises a hollow reel shaft or pipe 20 (Figure 4), a pair of hub elements 21 spaced axially of and fixed to the pipe, a plurality of arms 22 extending radially from the hubs, and a plurality of reel bats 23 at the outer ends of and interconnecting related pairs of arms 22. The reel pipe 20 is disposed transversely across and above the platform 16 and is rotatable about a transverse shaft 24. Opposite ends of the shaft 24 are carried in structure such as is indicated for one end of the shaft in Figures 1 and 4 particularly.

The means for supporting the ends of the shaft 24 includes a reel support designated generally by the numeral 25 which is arranged for adjustment vertically with respect to the platform. The supporting structure further includes a rearwardly extending brace 26 pivoted at 27 at its forward end to a U-shaped member 28 included in the reel support and pivotally connected at its rear end at 29 to an appropriate portion of the body 10. The particular arrangement is relatively unimportant and any other suitable structure could be substituted for that illustrated.

Figure 4:
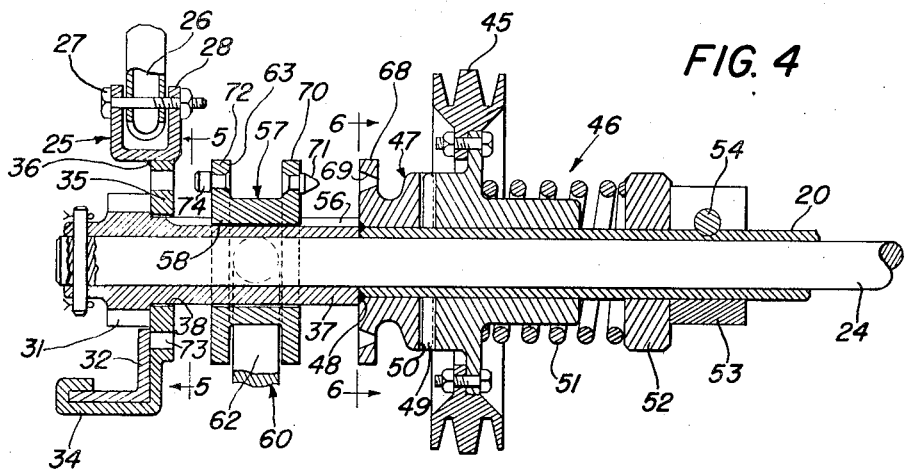
Figure 4 is an enlarged fragmentary horizontal sectional view taken substantially on the line 4—4 of Figure 3.

The means for adjusting the reel 19 and its related components, including the shaft 24, vertically with respect to the platform 16 comprises an adjustable device designated generally by the numeral 30 and including a pair of relatively movable parts here shown as a pinion 31 and a toothed rack 32 with which the pinion is in constant mesh. The lower end of the rack is articulately connected at 33 to an appropriate part of the platform 16 and an intermediate portion of the rack is suitably guided or carried with respect to the pinion 31 by means including a guide 34. This guide is preferably secured to or forms a part of the U-shaped member 28 by means of a centrally apertured member or plate 35. As shown, the member 35 and guide 34 are integral and the member 35 is secured to the member 28 as by welding at 36 (Figure 4).

Figure 3:
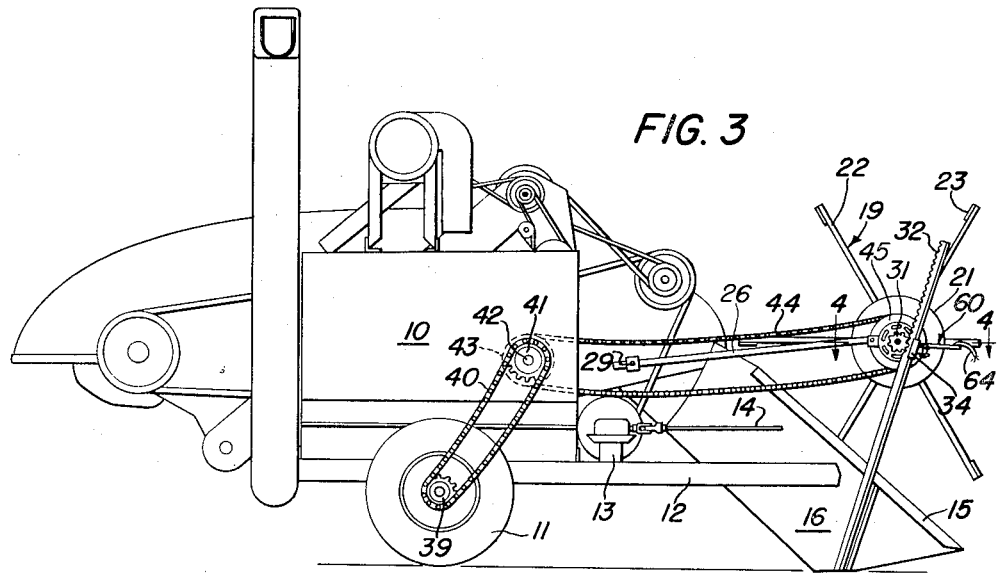
Figure 3 is a side elevational view, on a reduced scale, showing a typical harvester of a combine type equipped with the adjusting device.

The pinion 31 is preferably formed integral with a coaxial sleeve 37 that fits the outer end portion of the shaft 24 that projects axially at the right hand end of the reel 19 (the expression "right hand" being used with reference to relationship of the parts as viewed by a person standing at the rear of the machine and looking forwardly). The central aperture in the member 35, as designated by the numeral 38 in Figure 4, is sufficiently larger in diameter than the outside diameter of the sleeve 37 to receive the latter loosely, whereby the member 35, in effect, acts as a bearing or journaling means for the pinion and sleeve. The reel 19, being carried on the pipe 20, is rotatable relative to the shaft 24. The reel is supplied with power to effect the rotation thereof by power-transmitting means deriving its power in the first instance from the wheel 11 (Figure 3). The wheel 11 has fixed thereto a driving sprocket 39 by means of which power is transmitted through a chain 40 to an intermediate sprocket 41. This latter sprocket is fixed to a transverse shaft 42 which is journaled appropriately in the body 10 and which extends toward the left of the body to carry for rotation therewith a second intermediate sprocket 43. Power is transmitted from the sprocket 43 by means of a forwardly extending endless chain 44 to a sprocket 45 concentric with and connected in power-transmitting relationship to the reel 19 by means of a slip clutch 46 or its equivalent.

The sprocket 45 is loose on the reel pipe 20 but cooperates with a driving part 47 to transmit power to the pipe 20. The part 47 is connected to the pipe 20 for rotation therewith, preferably by means of welding the two together as at 48 (Figure 4). The sprocket 45 and driving part 47 have cooperative portions 49 and 50 which may be of any well known type or desired design. These portions are normally maintained in drive-transmitting relationship by means of a compression spring 51 which encircles the pipe 20 and reacts against a collar 52 held against axial shifting on the pipe 20 by means including a clamp 53 and securing bolt 54, the latter being preferably recessed in the pipe 20. The particular type of slip clutch illustrated may be varied according to circumstances and is illustrated herein only as means for preventing damage to the reel in the event that the reel strikes an obstruction, whereby the portions 49 and 50 may yield or slip and thus prevent rotation of the reel even though the transmission of power to the sprocket 45 is continued.

Normally, the reel is driven and rotates relative to the pinion 31, the latter being held by the rack 32. It will be appreciated, of course, that rotation of the pinion would cause the reel assembly and its related parts to move vertically up or down the rack, and it is this structure and function that are utilized to accomplish vertical adjustment of the reel assembly. In order that the adjustment of the reel with respect to the platform may be equalized, a similar rack and pinion or equivalent adjustable device may be provided at the opposite end of the reel, and a rack 55 for that purpose is visible in Figure 1. However, whatever device is used to effect rotation of the pinion 31 at the right hand end of the shaft 24 need not be duplicated at the opposite end of the shaft, since the shaft will transmit the torque from one end thereof to the other.

In the Lohse patent referred to above, the rack that corresponds to the rack 32 in the present instance is reversed with respect to the pinion; that is, the rack is behind the pinion. This relationship results from the type of manually operated mechanism utilized to rotate the pinion. In the prior patent, the pinion is rotated in a counterclockwise direction to obtain elevation of the reel and in a clockwise direction to obtain lowering of the reel. In the present case, inasmuch as power for rotating the pinion 31 is derived directly from the reel itself, and since the reel rotates in a clockwise direction (as viewed in Figure 1), the rack 32 is reversed; that is, is placed ahead of the pinion so that clockwise rotation of the pinion will cause the pinion to climb the rack and hence to raise the reel with respect to the platform 16. Conversely, reverse or counterclockwise rotation of the pinion will effect lowering of the reel. As will be hereinafter brought out more fully, lowering of the reel is accomplished by gravity, the reel being allowed to descend under its own weight, which is possible since the rack and pinion are not irreversible.

Figure 2:
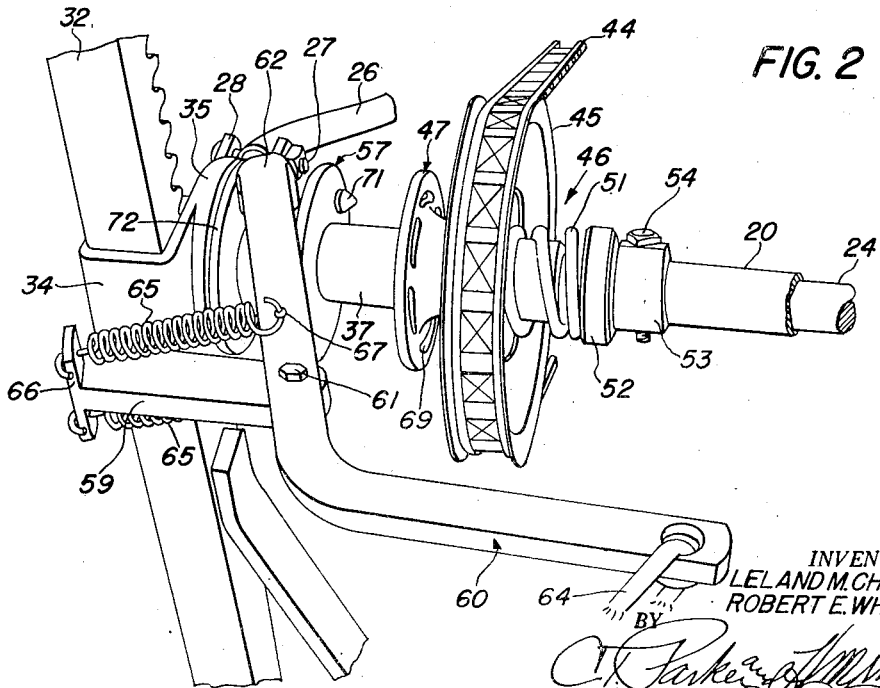
Figure 2 is a perspective view, on a scale slightly enlarged over that of Figure 1 and illustrating more clearly the power-transmitting means for the adjustable device.

As shown in Figure 4, the sleeve 37 which forms part of the pinion 31 and which extends axially toward the driving part 47, is formed with an axial keyway 56 by means of which a shiftable or driven part or member 57 is arranged for selectively establishing or interrupting drive between the sprocket 45 and pinion 31. The keyway 56 and a cooperating key 58 on the member or part 57 thus mounts the member for rotation with the pinion 31 but for axial shifting therealong toward and away from the member or part 47. In other words, the member 57 is shiftable back and forth between the members 35 and 47. The member 35 may be referred to as a stationary member and the member 47 may be referred to as a constantly rotating member. The member 57 is a dual purpose member, in that it is at times stationary and at times driven by the member or part 47. For the purpose of shifting the member 57 back and forth between the members 35 and 47, the supporting structure includes mounting means comprising a bracket 59 suitably secured to the rack guide 34, as best illustrated in Figure 2. To this bracket is pivoted control means including a control member 60, the pivotal connection being effected at 61. The member 60 is in the form of a bell crank one arm of which is in the form of a yoke 62 received in an annular groove 63 in the member 57, the latter being formed much in the manner of a conventional clutch collar. The other arm of the bell crank or member 60 is made available for operation by an operator on the tractor or other vehicle that is utilized to supply propelling power for the combine. For this purpose, the arm is connected by a forwardly extending control rope 64, it being understood that the forward end of the rope 64 may be tied by the operator to the seat or any other convenient part of the draft vehicle.

The pivotal mounting of the control arm 60 on the bracket 59 is such that a forward pull on the rope 64 will shift the collar or member 57 toward the driving part or member 47. The control member 60 is returned by resilient means including a pair of tension springs 65 so that the collar 57 is normally urged toward the member 35, or to the left as viewed in Figure 4. In the present instance, the bracket 59 is shown as having an extension 66 to spaced portions of which one end of each spring 65 is connected. The other ends of the springs 65 are connected to the yoke arm of the control member 60, as at 67. The construction illustrated may, of course, be replaced by any other construction of appropriate design, depending upon requirements or individual desires.

Figure 6:
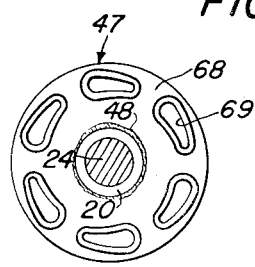
Figure 6 is a face view of one of the clutch parts, part of the view being in section and taken on the line 6—6 of Figure 4.

The members 47 and 57 comprise a connectible and disconnectible clutch and to this end each is provided with engageable portions. In the preferred form illustrated, the member 47 includes as an integral part thereof a circular flange 68 provided with a plurality of circumferentially spaced openings 69 (Figure 6). Each of these openings is preferably circumferentially elongated and is further tapered in the direction of rotation of the member 47. Still further, each portion is tapered in an axial direction toward the reel, as best shown in Figure 4.

The shiftable member or driven part is provided at its side proximate to the member 47 with a circular flange 70 from which projects a stud or lug 71. This stud is circular, although tapered in conformance with the axial taper of any one of the openings 69. The lug 71 is tapered and the openings 69 are preferably shaped as shown for the purpose of facilitating engagement and disengagement between the parts 47 and 57, since engagement is effected by a pull on the rope 64 to shift the member 57 into engagement with the member 47 and the continued application of pull on the rope to maintain engagement against the loading imposed by the springs 65. Inasmuch as the lug 71 is tapered, the operator has only to release the rope 64 and the springs 65 will disengage the member 57 from the member 47.

Figure 5:
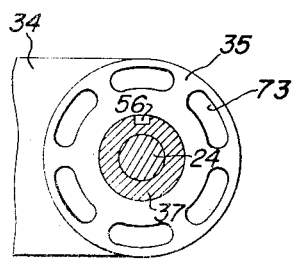
Figure 5 is a face view of part of the immobilizing means, the view being partly in section as viewed along the line 5—5 of Figure 4.

The shiftable driven member 57 is provided with a second circular flange 72 proximate to the plate or member 35. The member 35 and flange 72 comprise cooperative means for locking or immobilizing the adjustable device 35. For this purpose, the member 35 is provided with a plurality of circumferentially spaced and circumferentially elongated openings 73 (Figure 5), any one of which may be engaged by a cooperating portion in the form of a lug 74 on the proximate face of the flange 72. The lug 74 is preferably circular in cross section and therefore its dimension circumferentially as respects the flange 72 is considerably less than the length of any one of the openings or slots 73. This arrangement is provided for facilitating the engagement of the lug 74 with any of these openings when the member 57 is shifted by the springs 65 into cooperative engagement with the member 35 to effect locking or immobilizing of the pinion 31 and its associated integral sleeve 37, which position the member 57 normally occupies because of the tension on the springs 65. The member 57 is shown in this position in Figures 1 and 2 but is illustrated in an intermediate position in Figure 4.

The intermediate position of the member 57 may be secured by the operator by his balancing his pull on the rope 64 against the reaction of the springs 65 and he can thus effect shifting of the member 57 only part way between the members 47 and 35. For example, in the event that he desires to disengage the member 57 from the member 47 without allowing the member 57 to become immobilized by engagement with the member 35, he relaxes his tension on the rope and permits the springs 65 to disengage the member 57, but he immediately holds the rope when he determines that the member 57 is in its intermediate position. On the other hand, in shifting the member 57 from locking or immobilizing position, the operator may pull on the rope to an extent only sufficient to disengage the lug 74 from the member 35 but not sufficient to engage the lug 71 with the member 47. When the member 57 is in its intermediate position, power is not transmitted from the rotating reel to the pinion. When the member 57 is in its intermediate position, it is engaged with neither the member 47 nor the member 35. Accordingly, the reel may descend on the racks 32 and 55 by virtue of its own weight. Hence, power from the rotating reel is utilized to elevate the reel, gravity is the force that effects lowering of the reel, and securing of the reel in any adjusted position is effected by the immobilizing of the pinion 31 by the means comprising the parts or members 35 and 57.

*Operation*

The operation of the harvester equipped with the preferred embodiment of the power-transmitting unit as described above is relatively simple, especially as compared with the operation of manually powered devices of the type disclosed in the patent referred to above. The combine or other harvester is propelled over the field in the usual manner by a tractor, for example, and the forward end of the operating or control rope 64 is within convenient reach of the operator. In the event that the operator desires to elevate the reel with respect to the platform, he pulls on the rope 64 sufficiently to effect engagement between the members 47 and 57. There is no question but that the reel has sufficient power to rotate the pinion 31 and the companion pinion for the rack 55 at the other end of the reel shaft 24. Since the reel is constantly rotating in a clockwise direction, as viewed in Figure 1, the pinions will likewise be rotated in a clockwise direction and will climb the racks 32 and 55. After the desired height has been obtained, the operator will fully release the rope 64, whereupon the springs 65 will be effective to return the arm 60 toward the rack 32, thus shifting the member 57 axially toward the member 35 so that the lug 74 on the former engages one of the openings or slots 73 in the latter. Since the openings 73 are elongated over the circumferential dimension of the lug 74, engagement between these components will be easily effected. The pinion 31 thereupon becomes immobilized, as does the companion pinion at the other end of the shaft 24. The operator may effect further elevation of the reel by again quickly pulling on the rope 64 and by maintaining tension on the rope to keep the member 57 engaged with the member 47. The new position of the reel may be secured by the operator's releasing of the rope 64 so that the member 57 may engage with the locking member 35.

Now, should the operator desire to effect lowering of the reel, he will pull on the rope 64 only sufficiently to disengage the lug 74 from its mating opening 73 in the member 35, but not sufficiently to effect engagement of the drive lug 71 with the member 47. This will free the member 57 from both the locking member 35 and the driving member 47, whereupon the reel may descend by virtue of its own weight. In practice, it will be found that the operator can develop a sense of control so that he can readily determine the intermediate position of the member 57. Further, the intermediate position of this member can be determined without an exact centering of the member by the arm 60 and rope 64, since the tapered design of the lug 71 and openings 69 will tend to prevent engagement of the member 57 with the member 47 unless a conscious effort is made on the part of the operator to effect such engagement.

The adaptation of the power-transmitting means to a harvester as a conversion unit is readily accomplished. The pinion 31 and its associated sleeve 37 comprise a part that replaces the pinion of the type provided as original equipment in a harvester furnished with the device of the patent referred to above. The original rack at each end of the shaft 24 may be utilized, but is reversed with respect to the pinion as previously stated. The remainder of the parts may be specially furnished to replace original equipment. For example, the driving member 47 may be substituted for the original member which occupies the same relationship to the sprocket 45 as that illustrated. Similarly, the structure comprising the components 28, 35 and 34 may be furnished as a replacement unit. The brace 26 and pin 27 are part of the original equipment. It will thus be seen that very little, if any, material modification is required to effect the installation of the power-transmitting unit as an attachment or conversion unit.

The provision of the improved power-transmitting means as original equipment on harvesters may be just as readily effected, since it will be seen that material modifications in original design are not required.

*Summary*

Various objects and features of the invention not specifically pointed out above will undoubtedly occur to those versed in the art, as will numerous modifications and alterations in the preferred embodiment of the invention illustrated, all of which may be accomplished without departing from the spirit and scope of the invention as defined in the appended claims.

What is claimed is:

1. For harvesters of the type having a platform above which is carried for vertical adjustment a support on which is mounted reel structure including a rotating reel having a shaft projecting axially outwardly at one end thereof and a reel-driving element concentric with the reel and shaft for rotating the reel relative to the shaft, and wherein vertical adjustment of the reel structure is effected by a rack connected to the platform and extending upwardly adjacent to the shaft and in axially outwardly spaced relation to the reel-driving element, the improvement comprising: means including a pinion and a coaxial sleeve fixed thereto having provision for mounting on the outer end of the shaft for rotation relative to the reel-driving element and with the pinion in mesh with the rack; a driving part coaxially positionable adjacent to the reel-driving element in axially inwardly spaced relation to the pinion and having means for connection to and rotation with the reel-driving element, said driving part having a clutch portion facing the pinion; and a driven part rotatable with and selectively axially shiftable on the sleeve toward or away from the driving part and having a clutch portion facing and selectively engageable with or disengageable from the driving part clutch portion.

2. The invention defined in claim 1, further characterized in that: a locking member is provided with means for locking connection to the reel support in fixed position closely spaced outwardly of the driven part and having a locking portion facing inwardly toward the driven part; and the driven part has provided thereon a cooperative locking portion facing outwardly toward the locking member, said locking portions being disengageable when the driven part is shifted toward the driving part and engageable when the driven part is shifted away from the driving part.

3. The invention defined in claim 2, further characterized in that: the locking member and driving part are so axially spaced, and the driven part and its locking and clutch portions are so proportioned, that the driven part may occupy a position axially intermediate the locking member and driving part and with its locking and clutch portions respectively disengaged from the locking and clutch portions of the locking member and driving part, whereby the pinion is free to roll downwardly along the rack to allow the reel-structure to descend under its own weight.

4. The invention defined in claim 3, further characterized in that: a single control member having means for mounting on the support is provided with a connection to shift the driven part selectively among its locking, clutching or intermediate positions.

5. The invention defined in claim 1, further characterized in that: the clutch portion on one of the parts includes a radial face portion having therein a plurality of angularly spaced slots elongated circumferentially and tapered circumferentially in the direction of rotation of the driving part, and the clutch portion on the other part includes a lug thereon projecting toward the other clutch portion in position to engage one of said slots, the circumferential dimension of said lug being less than the circumferential elongation of a slot so as to facilitate connection of the lug and a slot.

6. The invention defined in claim 5, further characterized in that: each of said slots is further tapered axially inwardly, and the projecting end of the lug is correspondingly axially tapered so as to facilitate disconnection of the lug from a slot.

7. For a harvester having a platform, a support, a rotary reel vertically adjustable relative to the platform, and rotary drive means, the improvement comprising: means for fixed mounting on the support in axially spaced relation to the rotary means; clutch means for the rotary means facing the fixed means; lock means for the fixed means facing the rotary means; a drive part coaxially intermediate and rotatable relative to the fixed means and the rotary means, and having lock means at one side thereof and clutch means at its other side; means mounting the drive part for selective axial shifting in one direction from an intermediate position, in which its lock and clutch means are free from the lock and clutch means of the fixed means and rotary means, to a first position in which its clutch means engages the clutch means of the rotary means, or in the opposite direction to a second position in which its lock means engages the lock means of the fixed means; power-transmitting means interconnecting the drive part and the reel for elevating the reel when the drive part is in its first or clutching position, said power-transmitting means being effective to reverse the direction of rotation of the drive part when the drive part is in its intermediate position so that the reel may descend under its own weight; and said drive part in its second position effecting engagement of its locking means with the locking means of the fixed means to lock the drive part against reverse rotation and thereby to fix the reel against descending.

LELAND M. CHAPMAN.
ROBERT E. WHITNEY.

REFERENCES CITED

The following references are of record in the file of this patent:

UNITED STATES PATENTS

| Number | Name | Date |
| --- | --- | --- |
| 862,258 | Lait | Aug. 6, 1907 |
| 868,788 | Lait | Oct. 22, 1907 |
| 2,414,958 | Lohse | Jan. 28, 1947 |